United States Patent
Rao et al.

(10) Patent No.: US 12,362,810 B2
(45) Date of Patent: Jul. 15, 2025

(54) EFFICIENT PRACH SCHEDULING

(71) Applicant: Telefonaktiebolaget LM Ericsson (publ), Stockholm (SE)

(72) Inventors: Jing Rao, Sollentuna (SE); Jonas Karlsson, Upplands Väsby (SE); Bo Göransson, Sollentuna (SE); Torsten Carlsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 338 days.

(21) Appl. No.: 17/924,011

(22) PCT Filed: May 11, 2020

(86) PCT No.: PCT/EP2020/062975
§ 371 (c)(1),
(2) Date: Nov. 8, 2022

(87) PCT Pub. No.: WO2021/228349
PCT Pub. Date: Nov. 18, 2021

(65) Prior Publication Data
US 2023/0189343 A1    Jun. 15, 2023

(51) Int. Cl.
*H04W 74/0833* (2024.01)
*H04W 16/28* (2009.01)
*H04W 74/08* (2024.01)

(52) U.S. Cl.
CPC ....... *H04W 74/0833* (2013.01); *H04W 16/28* (2013.01); *H04W 74/0891* (2013.01)

(58) Field of Classification Search
None
See application file for complete search history.

(56) References Cited

U.S. PATENT DOCUMENTS

| 6,259,724 B1 | 7/2001 | Esmailzadeh |
| 6,282,184 B1 | 8/2001 | Lehman et al. |
| (Continued) | | |

FOREIGN PATENT DOCUMENTS

| AU | 2017254388 B2 | 10/2017 |
| CA | 3017220 A1 | 10/2017 |
| (Continued) | | |

OTHER PUBLICATIONS

Intention to Grant for European Patent Application No. 18725809.0, mailed Mar. 29, 2023, 50 pages.
(Continued)

*Primary Examiner* — Hong S Cho
(74) *Attorney, Agent, or Firm* — Withrow & Terranova, PLLC

(57) ABSTRACT

Systems and methods for efficient scheduling of Random Access Channel (RACH) occasions in a cellular communications system are provided. In one embodiment, a method performed by a base station comprises transmitting Synchronization Signal Blocks (SSBs) on respective transmit beams in accordance with a beam sweeping scheme. The SSBs are mapped to one or more RACH occasions in accordance with an N-to-1 mapping scheme where N is greater than 1. The method further comprises, for each RACH occasion, processing receive signals from at least a subset of antenna elements in an antenna array of the base station using respective narrowband receivers, thereby providing narrowband receive signals, and performing, based on the narrowband receive signals, random access preamble detection for multiple beam directions that correspond to at least a subset of the transmit beams on which at least a subset of the SSBs to which the RACH occasion is mapped were transmitted.

19 Claims, 13 Drawing Sheets

(56) References Cited

U.S. PATENT DOCUMENTS

| | | | |
|---|---|---|---|
| 7,301,924 | B1 | 11/2007 | Gurbuz et al. |
| 7,352,718 | B1 | 4/2008 | Perahia et al. |
| 7,929,412 | B1 | 4/2011 | Gurbuz et al. |
| 7,995,525 | B1 | 8/2011 | Perahia et al. |
| 8,437,422 | B2 | 5/2013 | Mundarath et al. |
| 8,625,507 | B1 | 1/2014 | Gurbuz et al. |
| 8,649,458 | B2 | 2/2014 | Kludt et al. |
| 8,737,328 | B1 | 5/2014 | Perahia et al. |
| 8,755,834 | B2 | 6/2014 | Vaisanen et al. |
| 8,792,839 | B2 | 7/2014 | Hu et al. |
| 8,923,448 | B2 | 12/2014 | Kludt et al. |
| 9,131,029 | B1 | 9/2015 | Perahia et al. |
| 9,225,398 | B2 | 12/2015 | Mundarath et al. |
| 9,236,928 | B1 | 1/2016 | Gurbuz et al. |
| 9,438,321 | B2 | 9/2016 | Novlan et al. |
| 9,991,939 | B2 | 6/2018 | Mundarath et al. |
| 10,469,159 | B2 | 11/2019 | Sridharan et al. |
| 10,498,369 | B2 | 12/2019 | Tidestav et al. |
| 10,911,124 | B1 | 2/2021 | Park et al. |
| 10,992,350 | B2 | 4/2021 | Wilson et al. |
| 11,064,534 | B2 * | 7/2021 | Agiwal ............ H04W 74/0833 |
| 11,082,101 | B2 | 8/2021 | Kretsch et al. |
| 11,088,457 | B2 | 8/2021 | Yoon et al. |
| 11,158,940 | B2 | 10/2021 | Rafique et al. |
| 11,178,646 | B2 | 11/2021 | Islam et al. |
| 11,323,145 | B2 | 5/2022 | Rafique et al. |
| 11,356,856 | B2 | 6/2022 | Leyh et al. |
| 11,469,498 | B2 | 10/2022 | Rafique |
| 11,653,319 | B2 * | 5/2023 | Qian .................... H04B 7/0617 370/329 |
| 2008/0165875 | A1 | 7/2008 | Mundarath et al. |
| 2011/0205913 | A1 | 8/2011 | Van Zelst et al. |
| 2013/0044650 | A1 | 2/2013 | Barker et al. |
| 2013/0344908 | A1 | 12/2013 | Hwang |
| 2014/0050280 | A1 | 2/2014 | Stirling-Gallacher et al. |
| 2015/0078282 | A1 | 3/2015 | Chae et al. |
| 2015/0201336 | A1 | 7/2015 | Shad et al. |
| 2015/0365975 | A1 | 12/2015 | Sahlin et al. |
| 2015/0365977 | A1 | 12/2015 | Tabet et al. |
| 2017/0006638 | A1 | 1/2017 | Sahlin et al. |
| 2017/0019928 | A1 | 1/2017 | Mraraghavan |
| 2017/0273026 | A1 | 9/2017 | Fakoorian et al. |
| 2017/0303263 | A1 | 10/2017 | Islam et al. |
| 2017/0331670 | A1 | 11/2017 | Parkvall et al. |
| 2017/0367121 | A1 | 12/2017 | Wei et al. |
| 2017/0374683 | A1 | 12/2017 | Tavares et al. |
| 2018/0049238 | A1 | 2/2018 | Frenne et al. |
| 2018/0241421 | A1 | 8/2018 | Tidestav et al. |
| 2018/0248668 | A1 | 8/2018 | Hwang et al. |
| 2018/0262994 | A1 | 9/2018 | Park et al. |
| 2019/0021118 | A1 | 1/2019 | Tishbi |
| 2019/0228545 | A1 | 7/2019 | Gan et al. |
| 2019/0267716 | A1 | 8/2019 | Yoon et al. |
| 2020/0059970 | A1 * | 2/2020 | Islam .................. H04W 56/001 |
| 2020/0127708 | A1 | 4/2020 | Hakola et al. |
| 2020/0266535 | A1 | 8/2020 | Rafique et al. |
| 2020/0280128 | A1 | 9/2020 | Rafique |
| 2021/0258034 | A1 | 8/2021 | Rafique et al. |
| 2023/0170973 | A1 | 6/2023 | Nilsson et al. |
| 2023/0188188 | A1 | 6/2023 | Nilsson et al. |

FOREIGN PATENT DOCUMENTS

| | | | |
|---|---|---|---|
| CA | 3237303 | A1 | 5/2023 |
| CN | 102238580 | A | 11/2011 |
| CN | 102917375 | A | 2/2013 |
| CN | 102917375 | B | 12/2014 |
| CN | 106413069 | A | 2/2017 |
| CN | 104170445 | B | 6/2018 |
| CN | 108781153 | A | 11/2018 |
| CN | 110870377 | A | 3/2020 |
| CN | 112367153 | A | 2/2021 |
| CN | 111162806 | B | 4/2021 |
| CN | 109075836 | B | 6/2021 |
| CN | 114640424 | A | 6/2022 |
| CN | 115516773 | A | 12/2022 |
| CN | 115552799 | A | 12/2022 |
| CN | 111555852 | B | 3/2023 |
| EP | 3446412 | B1 | 12/2020 |
| EP | 3338374 | A1 | 5/2021 |
| EP | 3430760 | B1 | 9/2021 |
| EP | 3682508 | B1 | 11/2021 |
| EP | 3446410 | B1 | 10/2022 |
| EP | 3804147 | B1 | 8/2023 |
| GB | 2432933 | A | 6/2007 |
| GB | 2432934 | A | 6/2007 |
| GB | 2436161 | A | 9/2007 |
| GB | 2459131 | A | 10/2009 |
| JP | 2008048086 | A | 2/2008 |
| JP | 5572721 | B2 | 8/2014 |
| JP | 6961606 | B2 | 11/2021 |
| JP | 7155314 | B2 | 10/2022 |
| KR | 20170049273 | A | 5/2017 |
| SG | 174031 | A1 | 9/2011 |
| TW | 201924415 | A | 6/2019 |
| WO | 2011106385 | A2 | 9/2011 |
| WO | 2012174922 | A1 | 12/2012 |
| WO | 2013017108 | A1 | 2/2013 |
| WO | 2014010986 | A1 | 1/2014 |
| WO | 2015188861 | A1 | 12/2015 |
| WO | 2017032391 | A1 | 3/2017 |
| WO | 2017092797 | A1 | 6/2017 |
| WO | 2017106868 | A1 | 6/2017 |
| WO | 2017160513 | A1 | 9/2017 |
| WO | 2017184302 | A1 | 10/2017 |
| WO | 2018056892 | A1 | 3/2018 |
| WO | 2019063072 | A1 | 4/2019 |
| WO | 2019218296 | A1 | 11/2019 |
| WO | 2019219020 | A1 | 11/2019 |
| WO | 2019219180 | A1 | 11/2019 |
| WO | 2019233571 | A1 | 12/2019 |
| WO | 2021223892 | A1 | 11/2021 |
| WO | 2021223893 | A1 | 11/2021 |

OTHER PUBLICATIONS

Examination Report for Indian Patent Application No. 202047054014, mailed Mar. 6, 2023, 5 pages.

Notice of Allowance for U.S. Appl. No. 17/923,743, mailed Apr. 17, 2024, 8 pages.

First Office Action for Chinese Patent Application No. 202080100758. 6, mailed Feb. 10, 2025, 19 pages.

Ericsson, "R1-1706015: NR four-step random access procedure," 3GPP TSG-RAN WG1 Meeting #88bis, Apr. 3-7, 2017, Spokane, Washington, 7 pages.

Ericsson, "R1-1714047: Consideration of PRACH Configuration in NR," 3GPP TSG-RAN WG1 Meeting #90, Aug. 21-25, 2017, Prague, Czech Republic, 5 pages.

Examination Report for European Patent Application No. 15753054. 4, mailed Jan. 25, 2019, 6 pages.

Intention to Grant for European Patent Application No. 15753054. 4., mailed Dec. 14, 2020, 5 pages.

International Search Report and Written Opinion for International Patent Application No. PCT/EP2015/069228, mailed Apr. 20, 2016, 9 pages.

International Search Report and Written Opinion for International Patent Application No. PCT/EP2018/062636, mailed Jan. 24, 2019, 12 pages.

Notice of Allowance for U.S. Appl. No. 17/055,575, mailed May 26, 2021, 7 pages.

Non-Final Office Action for U.S. Appl. No. 15/753,058, mailed Jul. 6, 2018, 9 pages.

Final Office Action for U.S. Appl. No. 15/753,058, mailed Dec. 26, 2018, 10 pages.

Advisory Action for U.S. Appl. No. 15/753,058, mailed Mar. 8, 2019, 3 pages.

Non-Final Office Action for U.S. Appl. No. 15/753,058, mailed Apr. 4, 2019, 6 pages.

(56) References Cited

OTHER PUBLICATIONS

Non-Final Office Action for U.S. Appl. No. 17/923,926, mailed Aug. 1, 2024, 22 pages.
Ericsson, "R1-161558: Introduction of NB-IOT," Draft Change Request, 3GPP TSG-RAN WG1 Meeting #84, Feb. 15-19, 2016, St. Julian's, Malta, 16 pages.
First Office Action for Chinese Patent Application No. 20188095685.9, mailed Sep. 9, 2023, 8 pages.
Office Action for Japanese Patent Application No. 2022-567626, mailed Feb. 20, 2024, 5 pages.
Ericsson, "R1-1700298: NR PRACH design," 3GPP TSG-RAN WG1 NR adhoc, Jan. 16-20, 2017, Spokane, Washington, 22 pages.
Ericsson, "R1-1706014: NR PRACH design and evaluations," 3GPP TSG-RAN WG1 Meeting #88bis, Apr. 3-7, 2017, Spokane, Washington, 40 pages.
Giordani, et al., "Standalone and Non-Standalone Beam Management for 3GPP NR at mmWaves," IEEE Communications Magazine, vol. 57, Issue 4, published online May 2018, 7 pages.
OPPO, "R1-1910987: On Channel Structure for 2-step RACH," 3GPP TSG RAN WG1 #98bis, Oct. 14-20, 2019, Chongqing, China, 9 pages.
International Search Report and Written Opinion for International Patent Application No. PCT/EP2020/062938, mailed Feb. 9, 2021, 11 pages.
International Search Report and Written Opinion for International Patent Application No. PCT/EP2020/062939, mailed Feb. 9, 2021, 11 pages.
International Search Report and Written Opinion for International Patent Application No. PCT/EP2020/062975, mailed Jan. 26, 2021, 11 pages.
Lagen, et al., "New Radio Beam-Based Access to Unlicensed Spectrum: Design Challenges and Solutions," IEEE Communications Surveys and Tutorials, vol. 22, Issue 1, Oct. 24, 2019, pp. 8-37.
Intention to Grant for European Patent Application No. 20725502.7, mailed May 13, 2025, 7 pages.
Notification to Grant for Chinese Patent Application No. 202080100758.6, mailed May 29, 2025, 6 pages.

\* cited by examiner

EFFICIENT PRACH SCHEDULING

This application is a 35 U.S.C. § 371 national phase filing of International Application No. PCT/EP2020/062975, filed May 11, 2020, the disclosure of which is incorporated herein by reference in its entirety.

TECHNICAL FIELD

The present disclosure relates to random access in a cellular communications system.

BACKGROUND

Third Generation Partnership Project (3GPP) Fifth Generation (5G) networks are being powered by a new technology known as millimeter wave (mmW). The term mmW refers often to a specific part of the radio frequency spectrum between 24 Gigahertz (GHz) and 100 GHZ. Compared to lower bands, radio waves in this part of the frequency spectrum have a very short wavelength and high atmospheric attenuation. The reason that mmW has been attractive for 5G networks is that this part of the frequency spectrum is for the most part unused. This means that the amount of bandwidth available to be used by the network can be greatly increased as compared to legacy networks. To combat high attenuation loss, 5G relies on massive Multiple Input Multiple Output (MIMO) and beamforming to direct transmit and receive beams and improve coverage. However, combining the massive antenna arrays needed for massive MIMO and beamforming with large bandwidth puts huge requirements on the interface between a radio unit of a base station (referred to as a New Radio (NR) base station (gNB) in 5G NR) and a baseband unit of the base station. Such an interface is often unaffordable. As a result, the interface limitation gives constraints on beamforming for mmW. One of the common implementations for mmW is that a gNB only transmits or receives in one direction at a time over the whole frequency carrier.

For initial access for mmW, the gNB transmits a Synchronization Signal Block (SSB), which includes both synchronization signals (i.e., a Primary Synchronization Signal (PSS) and a Secondary Synchronization Signal (SSS)) and a Physical Broadcast Channel (PBCH). More specifically, the SSB is normally beamformed and swept over multiple beam directions to cover the whole cell area. Compared to lower bands, multi-SSB beam sweeping is of high importance for mmW to ensure reasonable cell coverage. By detecting an SSB, a User Equipment (UE) can obtain the Physical Cell Identity (PCI), achieve downlink synchronization in both time and frequency domain, and acquire the timing for the PBCH. By detecting the PBCH, a UE can obtain basic system information. After detecting an SSB, a UE transmits a random access preamble on a Physical Random Access Channel (PRACH) to indicate to the gNB a random access attempt. As there are multiple SSB beams sweeping over the cell, the gNB normally sequentially listens to corresponding multiple beam directions during respective Random Access Channel (RACH) time/frequency occasions to detect if any UE is performing a random access attempt in that specific beam direction. In other words, the gNB commonly needs to schedule multiple consecutive RACH time/frequency occasions.

FIG. 1 illustrates an example association from SSBs to PRACH occasions. In this example, one SSB is mapped to one PRACH occasion, and several PRACH occasions are time/frequency multiplexed. In the illustrated example, the gNB transmits a first SSB in a first beam direction during a first time period, a second SSB in a second beam direction during a second time period, a third SSB in a third beam direction during a third time period, and a fourth SSB in a fourth beam direction during a fourth time period. The first SSB is mapped to a first PRACH occasion, the second SSB is mapped to a second PRACH occasion, the third SSB is mapped to a third PRACH occasion, and the fourth SSB is mapped to a fourth PRACH occasion. The PRACH occasions are, in this example, multiplexed in frequency and time. Please note that, in mmW, PRACH occasions normally cannot be frequency multiplexed as illustrated in FIG. 1, since the gNB typically can normally only receive in one direction at a time over the whole frequency carrier. However, frequency multiplexing of PRACH occasions is allowed by 3GPP specifications.

As discussed above, in mmW, one SSB is typically mapped to one PRACH occasion, and the PRACH occasions are time division multiplexed, as illustrated in the example of FIGS. 2A and 2B. In the example of FIGS. 2A and 2B, there are four downlink slots and one uplink slot. So, there is a 4:1 downlink to uplink ratio. Further, in this example, twenty-four SSBs are mapped to twenty-four PRACH occasions or twelve SSBs are mapped to twelve PRACH occasions. The problem with SSB and PRACH 1-to-1 mapping is long latency of the random access procedure and inefficient frequency utilization.

FIGS. 3A through 3C illustrate a scheduling example with Time Division Duplexing (TDD) 4:1 pattern. In this example, there are twelve SSB bursts over twelve beams scheduled in slots 1, 6, 11, 16, 21, and 26. The corresponding RACH occasions are in slots 9, 19, 29, ..., 119. Thus, after transmitting the twelve SSBs in the twelve corresponding beam directions, the gNB must listen for random access preambles from UEs during twelve RACH occasions, with the last of these twelve RACH occasions being in slot 119. If there are more SSBs/beam directions, listening for random access preambles after beam sweeping the SSBs will take an even longer amount of time and/or consume even more time-frequency resources.

In the PRACH occasions, as the receiving beam is in a certain direction corresponding to a specific SSB beam direction, no traffic data (i.e., Physical Uplink Shared Channel (PUSCH) transmissions) can be received to serve another UE(s) in a different direction(s), which results in a large penalty to frequency resource utilization. If the carrier bandwidth is 100 Megahertz (MHz), which corresponds to 66 Physical Resource Blocks (PRBs), then in this example 12*6 symbols*66 PRBs time/frequency resources are reserved for PRACH. The large penalty makes it impractical to adapt long format PRACH, as long format PRACH occupies more symbols and in turn would cause an even greater underutilization of frequency resources. However, a long format PRACH is necessary in some scenarios as it gives larger coverage compared to short format PRACH.

As such, there is a need for systems and methods that mitigate the large penalty to frequency utilization that results from a 1-to-1 SSB to PRACH resource mapping.

SUMMARY

Systems and methods for efficient scheduling of Random Access Channel (RACH) occasions in a cellular communications system are provided. In one embodiment, a method performed by a base station for random access in a cellular communications system comprises transmitting a plurality of Synchronization Signal Blocks (SSBs) on a respective plurality of transmit beams in accordance with a beam sweeping scheme. The plurality of SSBs are mapped to one or more RACH occasions in accordance with an N-to-1 mapping scheme where N is greater than 1. The method further comprises, for each RACH occasion of the one or more RACH occasions, processing a plurality of receive signals from at least a subset of a plurality of antenna elements in an antenna array of the base station using a respective plurality of narrowband receivers to thereby provide a plurality of narrowband receive signals and performing, based on the plurality of narrowband receive signals, random access preamble detection for a plurality of beam directions that correspond to at least a subset of the plurality of transmit beams on which at least a subset of the plurality of SSBs to which the RACH occasion is mapped were transmitted. In this manner, N-to-1 SSB to RACH occasion mapping is enabled. As a result, both random access latency and frequency resource overhead are substantially reduced as compared to conventional 1-to-1 SSB to RACH occasion mapping.

In one embodiment, the one or more RACH occasions consist of a single RACH occasion, and all of the plurality of SSBs are mapped to the single RACH occasion.

In one embodiment, the one or more RACH occasions comprise a first RACH occasion and a second RACH occasion, and the plurality of SSBs comprise a first set of SSBs mapped to the first RACH occasion and a second set of SSBs mapped to the second RACH occasion. In one embodiment, the first set of SSBs and the second set of SSBs are mutually exclusive. In one embodiment, the first set of SSBs is a first subset of the plurality of SSBs that are transmitted on a first subset of the plurality of transmit beams having beam directions that are spatially adjacent to one another, and the second set of SSBs is a second subset of the plurality of SSBs that are transmitted on a second subset of the plurality of transmit beams having beam directions that are spatially adjacent to one another.

In one embodiment, a bandwidth of each of the plurality of narrowband receivers is equal to or greater than a bandwidth of each of the one or more RACH occasions.

In one embodiment, a bandwidth of each of the plurality of narrowband receivers is less than a bandwidth of wideband receiver of the base station.

In one embodiment, the plurality of narrowband receive signals correspond to Orthogonal Frequency Division Multiplexing (OFDM) symbols or accumulated OFDM symbols.

Corresponding embodiments of a bases station are also provided. In one embodiment, a base station for random access in a cellular communications system is adapted to transmit a plurality of SSBs on a respective plurality of transmit beams in accordance with a beam sweeping scheme, where the plurality of SSBs are mapped to one or more RACH occasions in accordance with an N-to-1 mapping scheme where N is greater than 1. The base station is further adapted to, for each RACH occasion of the one or more RACH occasions, process a plurality of receive signals from at least a subset of a plurality of antenna elements in an antenna array of the base station using a respective plurality of narrowband receivers to thereby provide a plurality of narrowband receive signals and perform, based on the plurality of narrowband receive signals, random access preamble detection for a plurality of beam directions that correspond to at least a subset of the plurality of transmit beams on which at least a subset of the plurality of SSBs to which the RACH occasion is mapped were transmitted.

In one embodiment, the one or more RACH occasions consist of a single RACH occasion, and all of the plurality of SSBs are mapped to the single RACH occasion.

In one embodiment, the one or more RACH occasions comprise a first RACH occasion and a second RACH occasion, and the plurality of SSBs comprise a first set of SSBs mapped to the first RACH occasion and a second set of SSBs mapped to the second RACH occasion. In one embodiment, the first set of SSBs and the second set of SSBs are mutually exclusive. In one embodiment, the first set of SSBs is a first subset of the plurality of SSBs that are transmitted on a first subset of the plurality of transmit beams having beam directions that are spatially adjacent to one another, and the second set of SSBs is a second subset of the plurality of SSBs that are transmitted on a second subset of the plurality of transmit beams having beam directions that are spatially adjacent to one another.

In one embodiment, a bandwidth of each of the plurality of narrowband receivers is equal to or greater than a bandwidth of each of the one or more RACH occasions.

In one embodiment, a bandwidth of each of the plurality of narrowband receivers is less than a bandwidth of a wideband receiver of the base station.

In one embodiment, the plurality of narrowband receive signals correspond to OFDM symbols, or accumulated OFDM symbols.

In another embodiment, a base station for random access in a cellular communications system comprises an antenna array comprising a plurality of antenna elements, a radio unit, and a baseband unit. The radio unit comprises a wideband transmitter coupled to the plurality of antenna elements and a plurality of narrowband receivers coupled to at least a subset of the plurality of antenna elements, respectively. The baseband unit is configured to transmit, via the wideband transmitter of the radio unit, a plurality of SSBs on a respective plurality of transmit beams in accordance with a beam sweeping scheme, wherein the plurality of SSBs are mapped to one or more RACH occasions in accordance with an N-to-1 mapping scheme where N is greater than 1. The baseband unit is further configured to, for each RACH occasion of the one or more RACH occasions, receive a plurality of narrowband receive signals via the plurality of narrowband receivers and perform, based on the plurality of narrowband receive signals, random access preamble detection for a plurality of beam directions that correspond to at least a subset of the plurality of transmit beams on which at least a subset of the plurality of SSBs to which the RACH occasion is mapped were transmitted.

BRIEF DESCRIPTION OF THE DRAWINGS

The accompanying drawing figures incorporated in and forming a part of this specification illustrate several aspects of the disclosure, and together with the description serve to explain the principles of the disclosure.

Figures 2A, 2B:
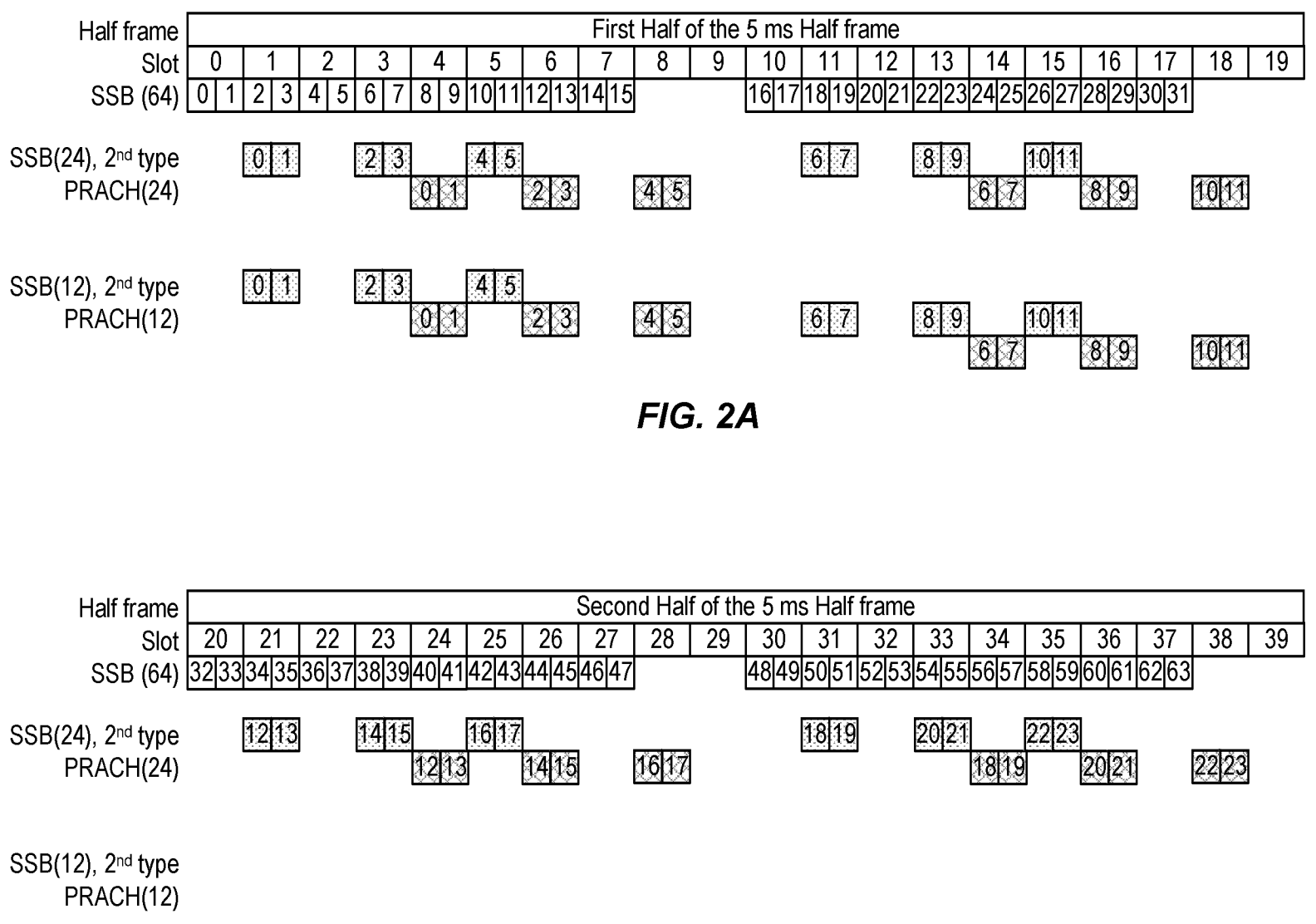

FIGS. 2A and 2B illustrate the mapping of one SSB to one PRACH occasion, where PRACH occasions are time division multiplexed, in the conventional manner;

DETAILED DESCRIPTION

Figure 1:
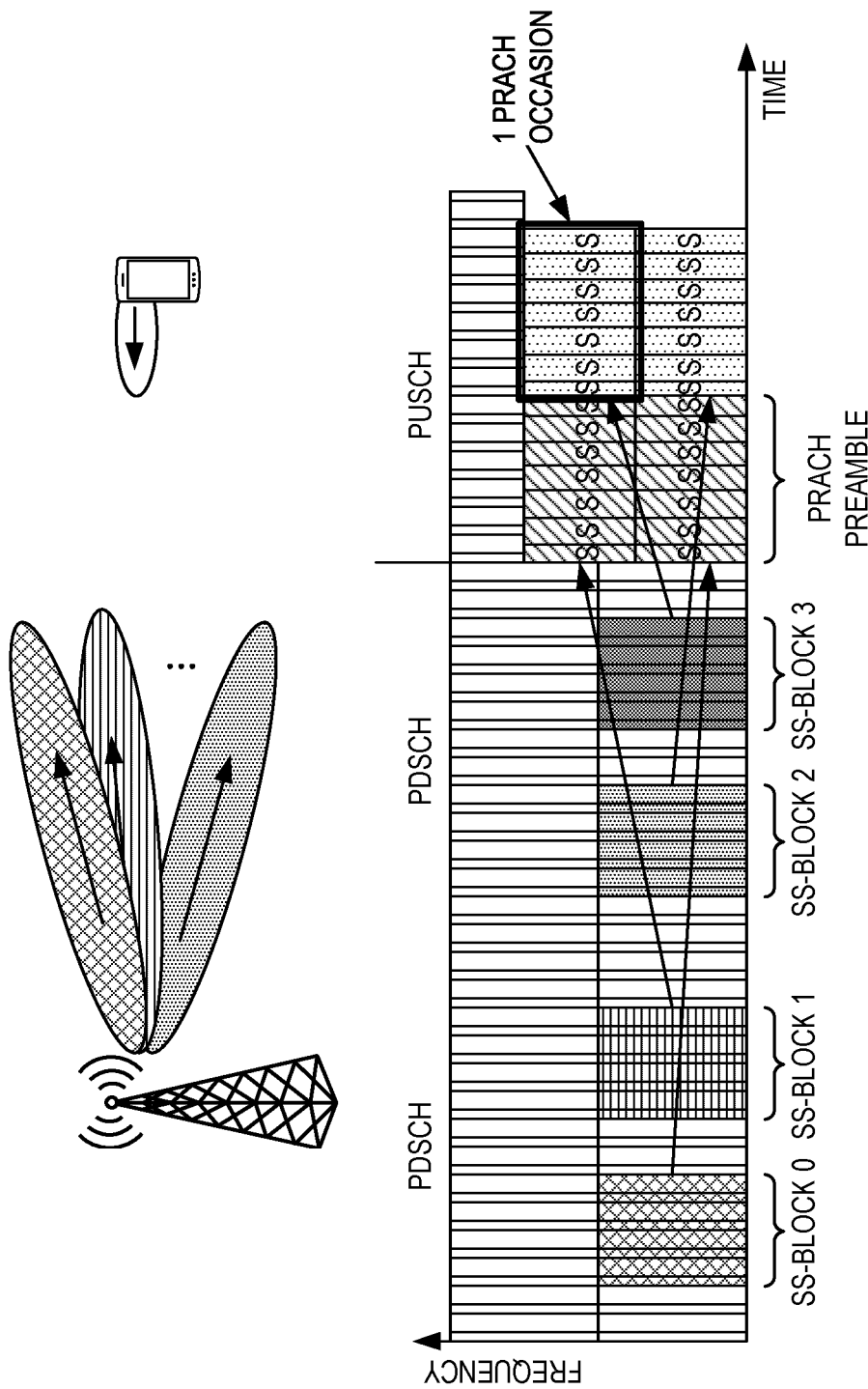
FIG. 1 illustrates an example association from Synchronization Signal Blocks (SSBs) to Physical Random Access Channel (PRACH) occasions.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods are disclosed herein for avoiding a 1-to-1 SSB to Physical Random Access Channel (PRACH) mapping. In other words, systems and methods are disclosed herein that enable an N-to-1 SSB to PRACH mapping, where N is an integer that is greater than 1. More specifically, in one embodiment, a radio access node (e.g., a base station such as, e.g., a gNB)) includes a Narrowband Receiver (NBR) that enables the radio access node to receive signals simultaneously from multiple wireless communication devices (e.g., UEs) in various beam directions. In one embodiment, the NBR is a digital receiver that receives (i.e., listens) in multiple directions (e.g., all directions) at the same time, although over only a portion of the full system bandwidth.

In one embodiment, the radio access node is a NR radio access node, and, for PRACH with preamble formats for short sequences (e.g., L=139), twelve Physical Resource Blocks (PRBs) are enough to process PRACH and, as such, the bandwidth of the NBR is equal to twelve PRBs. In one embodiment, the NBR is an all-direction receiver, and all Synchronization Signal Blocks (SSBs) are mapped to one PRACH occasion. In another embodiment, the NBR is a multiple-direction receiver, and multiple SSBs are mapped to one PRACH occasion.

Note that, herein, a NBR is described as a receiver that processes a limited set of the total system bandwidth. By doing so, the amount of information that needs to be transferred over the interface between the radio unit of the radio access node and the baseband unit of the radio access node is substantially reduced. This overcomes the interface limitations described above. In doing so, the NBR can receive in multiple (e.g., all) beam directions simultaneously without putting extreme requirements on the interface between the radio unit and the baseband unit. This enables the N-to-1 SSB to PRACH occasion mapping described herein. Other ways to limit the requirements on the needed interface bandwidth can also be envisioned. For example, it is possible to only process a limited set of the available Orthogonal Frequency Division Multiplexing (OFDM) symbols. Yet another alternative would be to process only a subset of the available spatial dimensions, e.g. a subset of the available antennas or beams. These alternatives may be used as alternatives to the NBR or used in combination with the NBR to reduce the bandwidth requirements on the interface between the radio unit and the baseband unit, which in turn enables an N-to-1 SSB to PRACH occasion mapping.

The proposed solution avoids the need for a 1-to-1 SSB to PRACH occasion mapping. As a result, both random access latency and frequency resource overhead are substantially reduced. In addition, in each PRACH occasion, PRBs outside of the bandwidth of the NBR can be scheduled for PUSCH transmission from another UE. For example, a 100 megahertz (MHz) carrier has sixty-six PRBs. If twelve PRBs are processed by the NBR, the remaining fifty-four PRBs can be scheduled for another beam, direction, or UE.

In addition, the significantly reduced frequency resource overhead provided by embodiments of the proposed solution implies that long format PRACH can be adapted to improve cell coverage when necessary. Still further, more SSB beams can be configured, as PRACH latency and overhead is significantly decreased with embodiments of the proposed solution. Many narrow SSB beams will increase the gain of each beam and hence increase the coverage of the SSB.

Moreover, after a random access preamble is received by the radio access node (e.g., gNB) via the NBR, the radio access node may decide a more accurate beam direction with higher beamforming gain based on the received random access preamble. The newly decided beam direction can be directly applied on the random access response and the signaling after the random access response. This can significantly improve link budget for such signaling, where this link budget often can be challenging with the existing solutions.

Putting it all together, the proposed solutions will lead to a significant system performance improvement. All this can be achieved with the current interface constraints for the network.

Figure 4:
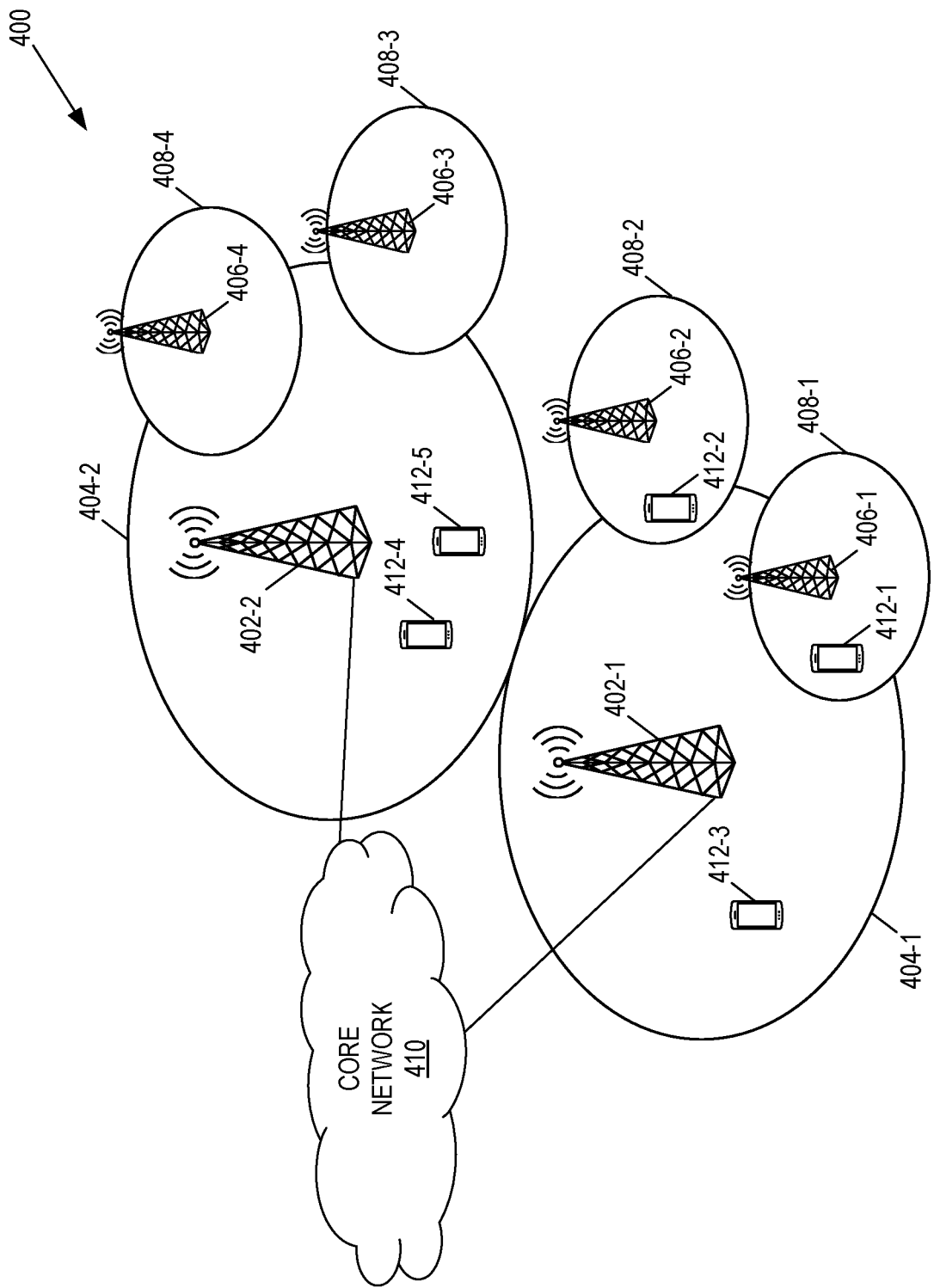
FIG. 4 illustrates one example of a cellular communications network in which embodiments of the present disclosure may be implemented.

In this regard, FIG. 4 illustrates one example of a cellular communications system 400 in which embodiments of the present disclosure may be implemented. In the embodiments described herein, the cellular communications system 400 is a 5G System (5GS) including a Next Generation RAN (NG-RAN) that includes gNBs which utilize the NR Radio Access Technology (RAT) and, optionally, next generation eNBs (ng-eNBs) (i.e., LTE base stations connected to the 5G Core (5GC)). In this example, the RAN includes base stations 402-1 and 402-2, which in 5G NR are referred to as gNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
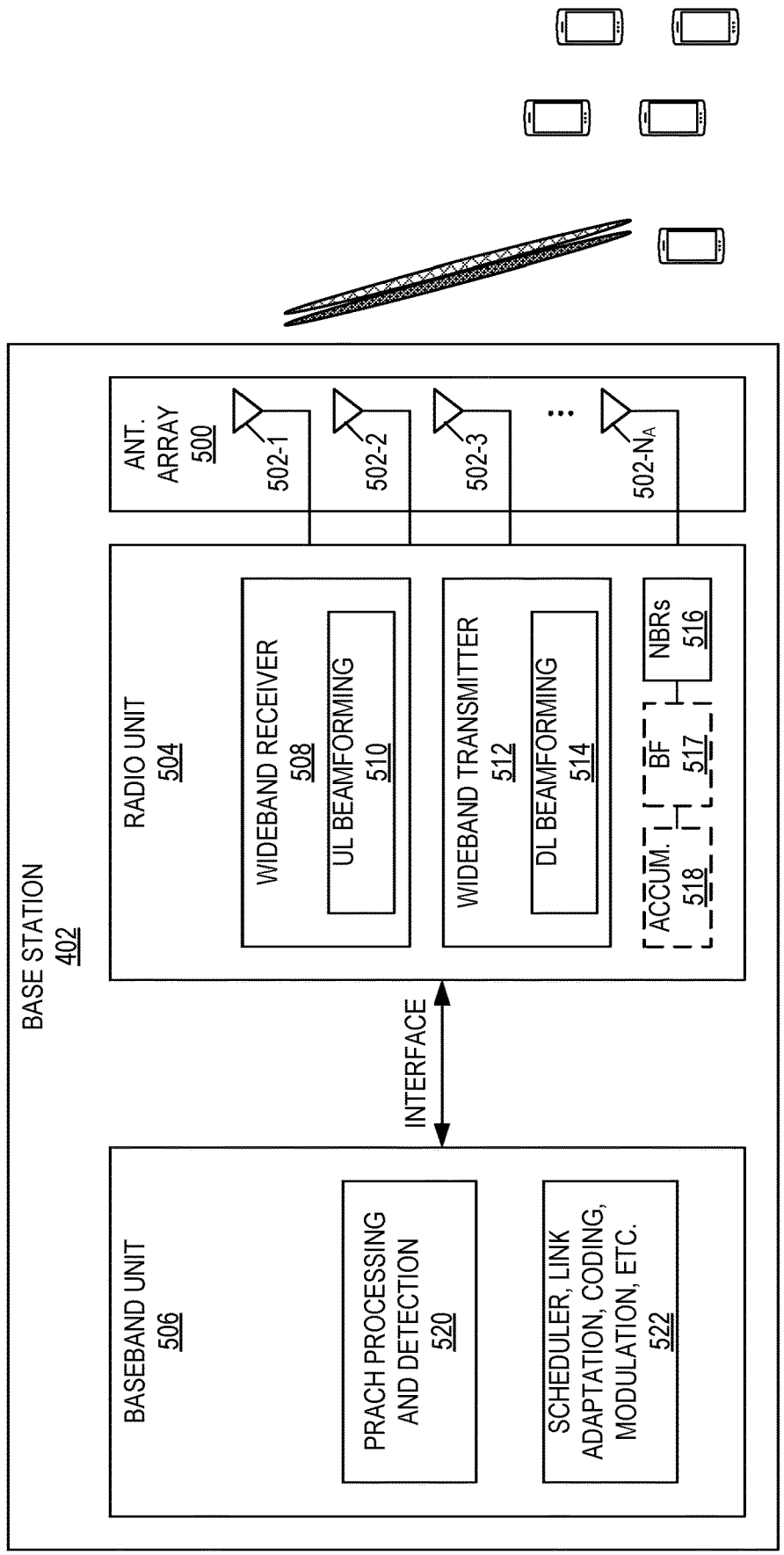
FIG. 5 illustrates a base station according to one embodiment of the present disclosure.

FIG. 5 illustrates a base station 402 according to one embodiment of the present disclosure. Note that this discussion is also applicable to the base stations 406. Note that optional components are represented by dashed boxes. As illustrated, the base station 402 includes an antenna array 500, which includes a number of antenna elements 502-1 through 502-$N_A$, where $N_A$ is an integer value that is greater than or equal to 2 but is preferably substantially greater than 2 (e.g., 8, 16, 32, 64, etc.). Note that each antenna element 502 may be a single antenna element or a set of antenna elements connected to a common feeder port.

The base station 402 also includes, in this example, a radio unit 504, which may be implemented as an Application Specific Integrated Circuit (ASIC) which is denoted herein as a "radio ASIC", and a baseband unit 506, which may be implemented as another ASIC which is denoted herein as a "baseband ASIC". The radio unit 504 includes a wideband receiver 508 coupled to the antenna elements 502-1 through 502-$N_A$ of the antenna array 500. The wideband receiver 508 includes, among other things, uplink beamforming components 510 (e.g., amplifier or gain circuits and phase adjustment circuits) that operate to provide receive beamforming on signals received via the antenna elements 502-1 through 502-$N_A$ of the antenna array 500. The radio unit 504 also includes a wideband transmitter 512 that is also coupled to the antenna elements 502-1 through 502-$N_A$ of the antenna array 500. The wideband transmitter 512 includes, among other things, downlink beamforming components 514 (e.g., gain circuits and phase adjustment circuits) that operate to provide transmit beamforming on signals (e.g., SSBs) transmitted via the antenna elements 502-1 through 502-$N_A$ of the antenna array 500. Note that the uplink and/or downlink beamforming may alternatively be performed at least partially in the baseband unit 506 (e.g., part of the uplink (i.e., receive) beamforming is performed in the radio unit 504 to compress the amount of data and then a second part of the uplink beamforming is done in baseband).

In accordance with embodiments of the present disclosure, the radio unit 504 also includes narrowband receivers 516 coupled to the antenna elements 502-1 through 502-N$_A$ of the antenna array 500 or at least a subset of the antenna elements 502-1 through 502-N$_A$ of the antenna array 500. Optionally, the radio unit 504 may include accumulators 518 that operate to accumulate the outputs of the narrowband receivers 516, e.g., as described in commonly owned and assigned International Patent Application Publication No. WO 2019/219810 A1, entitled COST EFFICIENT PRACH DETECTION, which was published Nov. 21, 2019. The accumulation results in averaging of the signals output by the narrowband receivers 516 over multiple symbols, which may be beneficial to reduce the amount of information that is transferred to the baseband unit 506 for Random Access Channel (RACH) detection in the case of a PRACH preamble format that uses symbol repetitions.

The baseband unit 506 includes PRACH processing and detection circuitry 520 that operates to process the outputs of the narrowband receivers 516 or, if present, the accumulators 518 and perform PRACH detection based on the results of the processing. In addition, the baseband unit 506 includes functions 522 including a scheduler, link adaptation function, coding and modulation function, etc., as will be appreciated by one of ordinary skill in the art.

The narrowband receivers 516 in the radio unit 504 operate to process the received signals from at least a subset of the antenna elements 502-1 through 502-N$_A$ of the antenna array 500 to output corresponding narrowband receive signals. In one embodiment, the narrowband receivers 516 process the received signals from all of the antenna elements 502-1 through 502-N$_A$ of the antenna array 500, at a limited bandwidth, to provide corresponding narrowband receive signals for all of the antenna elements 502-1 through 502-N$_A$ of the antenna array 500. The limited bandwidth corresponds to a portion of the full system bandwidth that includes the frequency resources (e.g., PRBs) in which random access preambles can be transmitted by the UEs 412 (i.e., the portion of the full system bandwidth in which the RACH occasion(s) mapped to transmitted SSBs is located). In another embodiment, the narrowband receivers 516 process the received signals from only a subset of the antenna elements 502-1 through 502-N$_A$ of the antenna array 500, at the limited bandwidth, to provide corresponding narrowband receive signals for that subset of the antenna elements 502-1 through 502-N$_A$ of the antenna array 500.

In addition, in some embodiments, the narrowband receivers 516 output the narrowband receive signals during a limited period of time (e.g., a limited number of symbols). This limited period of time includes the time resource(s) on which random access preambles can be transmitted by the UE 412 (e.g., the OFDM symbols in which the RACH occasion(s) mapped to transmitted SSBs is located). There may be a compromise regarding number of antennas elements N$_A$, processing bandwidth (i.e., bandwidth of the narrowband receivers 516), and the number of symbols (i.e., the limited period of time during which the narrowband receivers 516 output the narrowband receive signals). This compromise may be such that the output data fits the available interface capability.

In one embodiment, the narrowband receivers 516 receive signals in all directions (e.g., in all beam directions). As discussed below, this enables an N-to-1 SSB to PRACH occasion mapping. Then, when for PRACH preamble reception and detection, the narrowband receivers 516 will process receive signals from all of the antenna elements 502-1 through 502-N$_A$ over, for instance, only twelve of the available sixty-six PRBs (in the case of a 100 MHz carrier) and the dedicated symbols scheduled for PRACH.

Figure 3A:
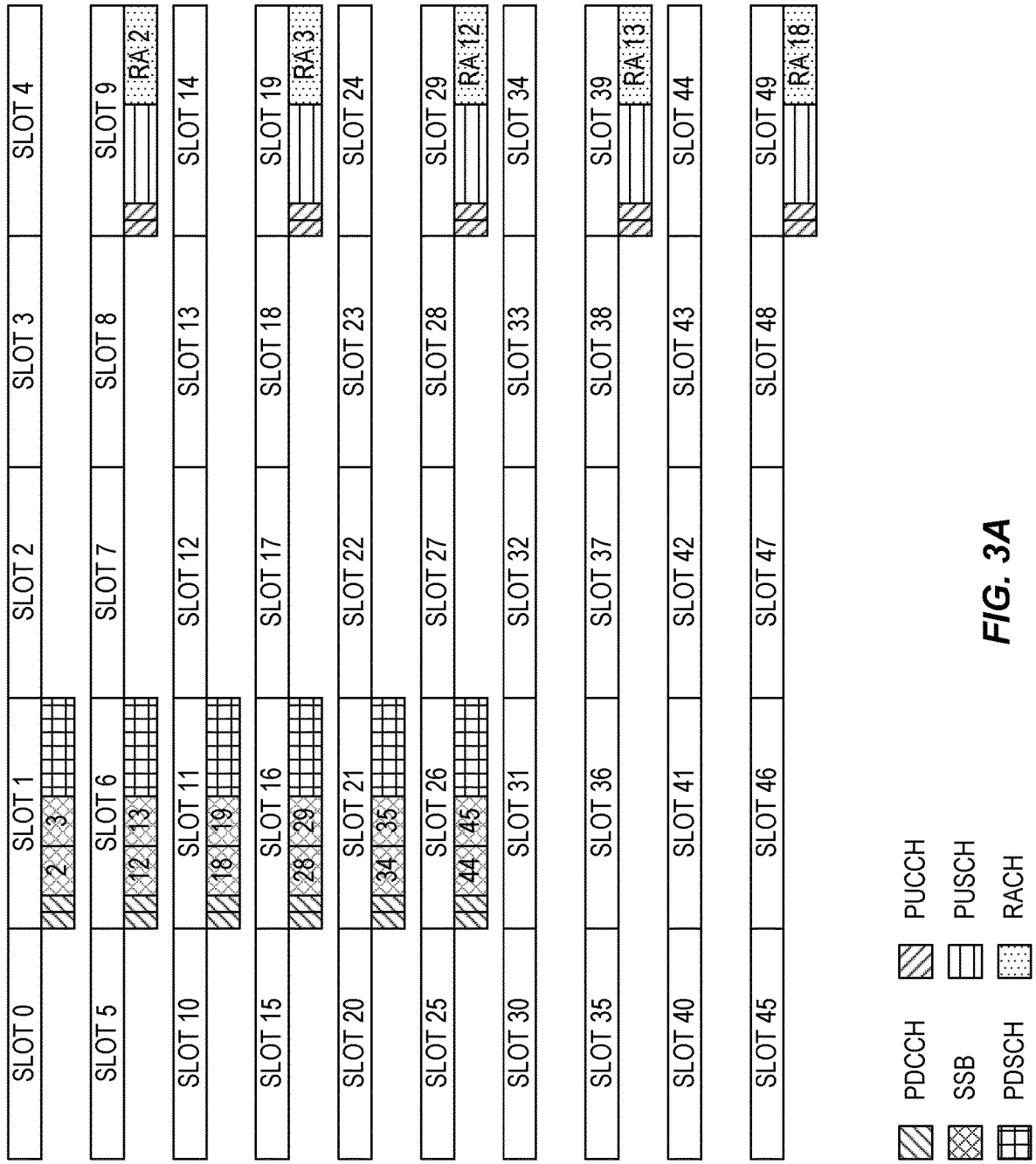
FIGS. 3A through 3C illustrate a scheduling example with Time Division Duplexing (TDD) 4:1 pattern.
Figure 3B:
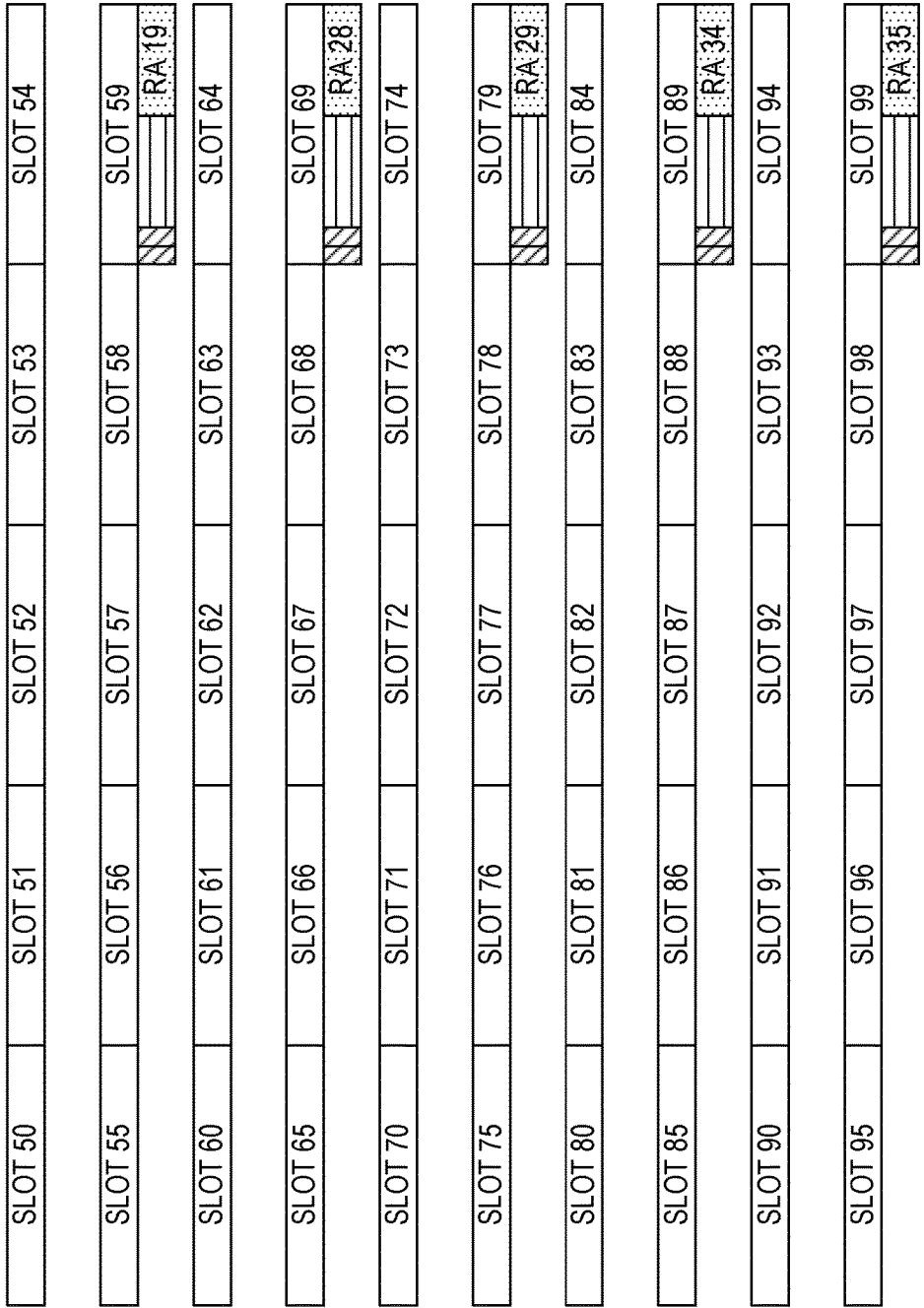
Figure 3C:
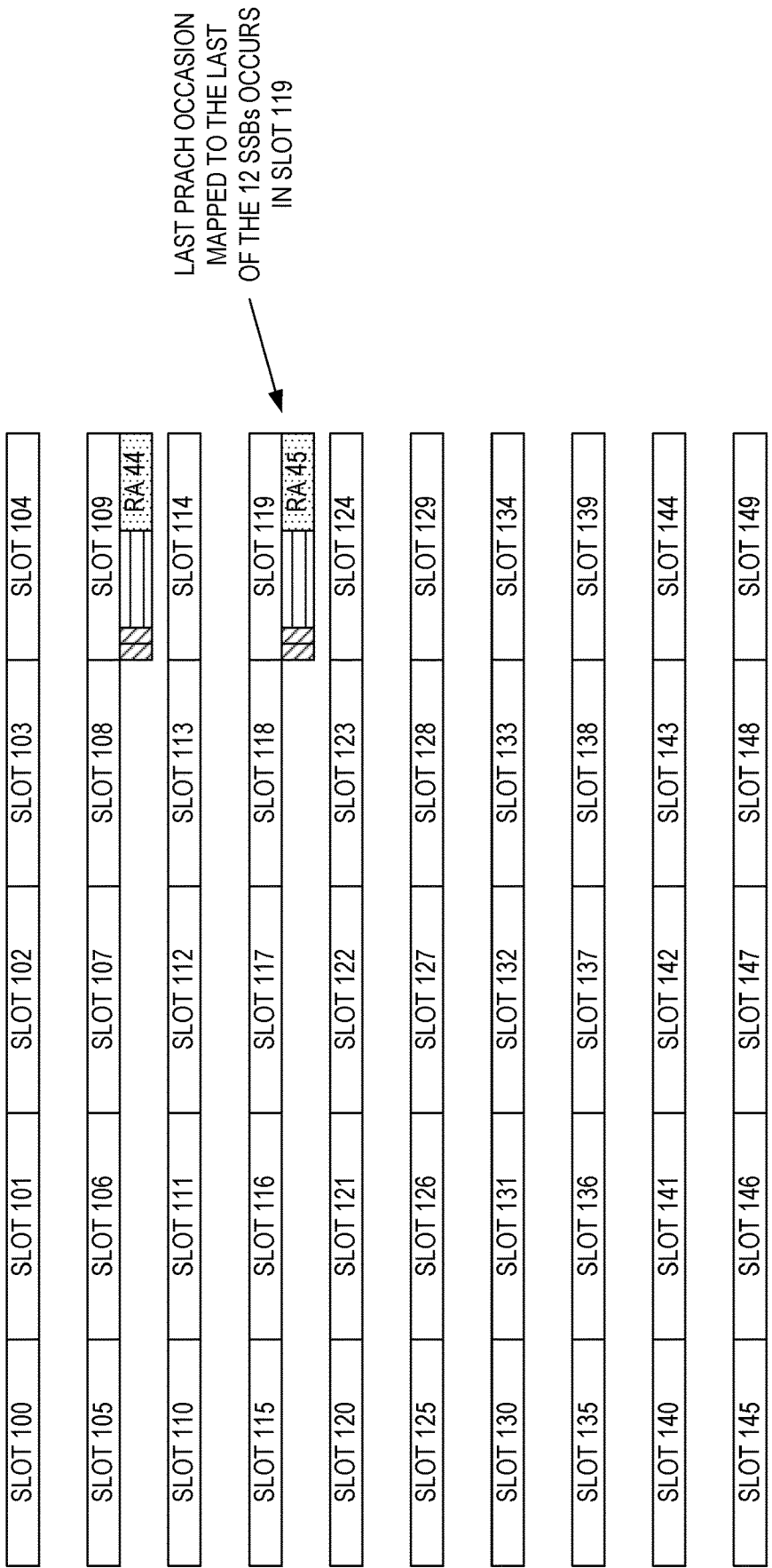
Figure 6:
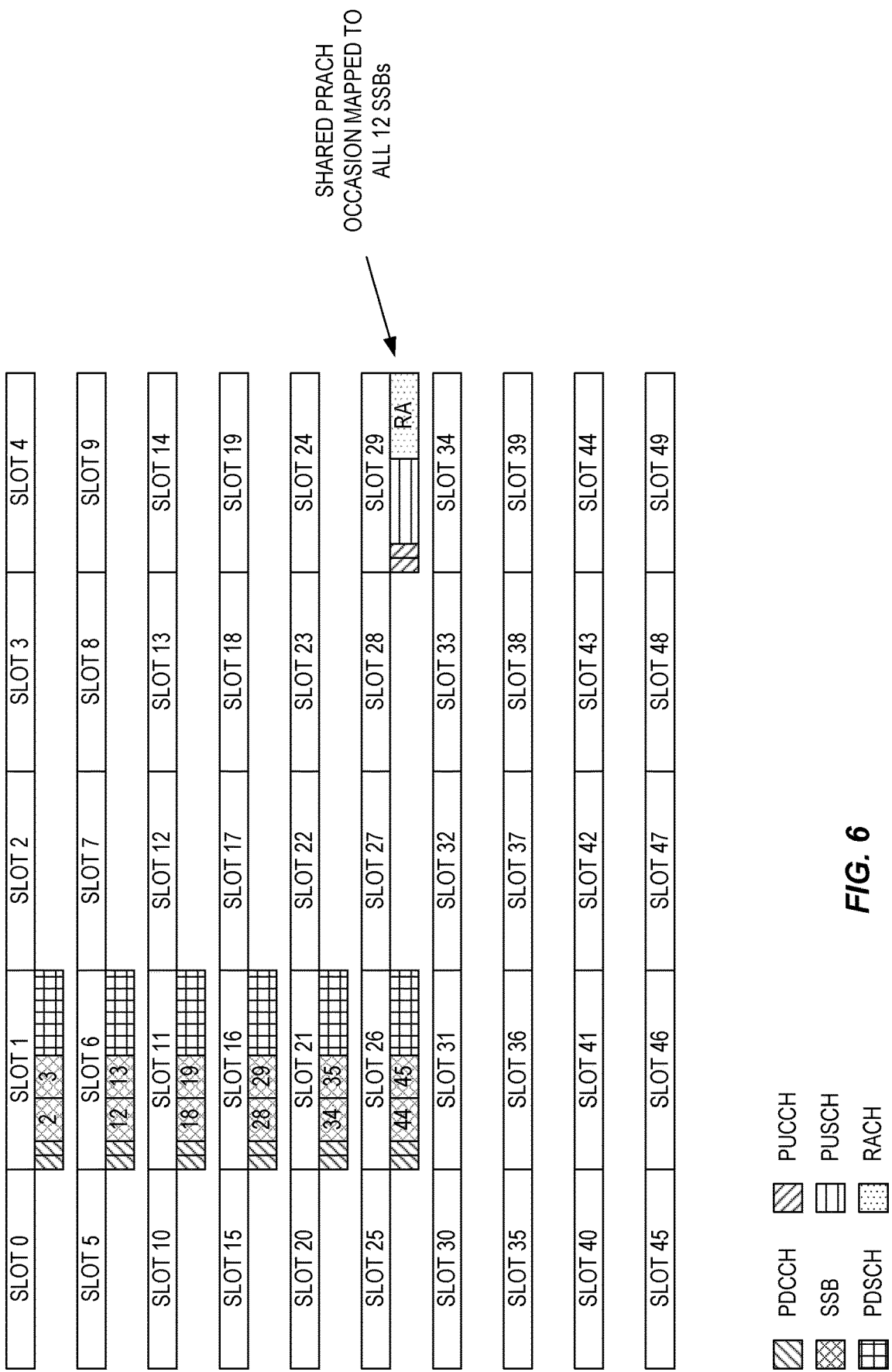
FIG. 6 shows an example in which multiple SSBs are mapped to a single PRACH occasion in accordance with an embodiment of the present disclosure.

If the narrowband receivers 516 receive signals in all directions for PRACH preamble detection, the scheduler 522 of the baseband unit 506 only needs to schedule one PRACH occasion after all SSB beams are swept. Using the TDD 4:1 scheduling example illustrated in FIGS. 3A through 3C, only one PRACH occasion, rather than twelve PRACH occasions, needs to be scheduled. FIG. 6 shows an example in which this single PRACH occasion is scheduled in slot 29. Compared with the existing solution where twelve PRACH occasions are needed and the last PRACH occasion is scheduled in slot 119 (see FIGS. 3A through 3C), the example of the proposed solution shown in FIG. 6 shortens the RACH latency by 90 slots. In addition, the resources in slots 9, 19, 39, . . . , 119 can be now utilized for Physical Uplink Shared Channel (PUSCH) transmission. This gives a suggested scheduling pattern shown in FIG. 6. In slot 29, during those symbols where the PRACH occasion is scheduled, PUSCH from another UE(s) can be frequency multiplexed with the PRACH preamble transmission (i.e., in PRBs that are outside the limited bandwidth of the narrowband receivers 516) and processed by the wideband receiver 508.

In the example above, the time/frequency resource reserved for PRACH preamble reception and detection at the base station 402 is only 1*6 symbols*12 PRBs. This is compared to a case without the proposed solution where 12*6 symbols*66 PRBs needs to be allocated to PRACH (see FIGS. 3A through 3C).

Note that, in Release 15 3GPP specifications, for FR2, the least number of RACH occasions in each subframe (10 ms) is two RACH occasions. With that, there has to be four RACH occasions in 20 ms, occurring in slots 39, 79, 119, and 159. Thus, Release 15 3GPP specifications do not support a RACH configuration such as that illustrated in FIG. 6. However, even if four RACH occasions in 20 ms are required, significant reduction of frequency-time resource overhead is achieved by, e.g., mapping all twelve SSBs to one of these RACH occasions in a manner similar to what is shown in the example of FIG. 6. In the example above, the time/frequency resource reserved for PRACH preamble reception and detection at the base station 402 is only 4*6 symbols*12 PRBs. This is compared to a case without the proposed solution where 12*6 symbols*66 PRBs needs to be allocated to PRACH (see FIGS. 3A through 3C).

In another embodiment, the narrowband receivers 516 receive signals in multiple directions, which may be all directions or a subset of all directions. In this case, if the narrowband receivers 516 receive signals in multiple directions but less than all directions, more than one PRACH occasion may be used in order to support receiving random access preambles in all directions (e.g., a first PRACH occasion for a first subset of all directions and a second PRACH occasion for a second subset of all directions, where the narrowband receivers 516 can be used to receive signals in the first and second subsets of directions during different time periods corresponding to the first and second PRACH occasions, respectively). Note that, in this case, the radio unit 504 further includes a beamforming (BF) function 517 that performing spatial filtering of the narrowband receive signals received from the narrowband receivers 516. Alternatively, this spatial filtering is done in the baseband unit 506. As another example alternative, the BF function 517 may be between the NBRs 516 and the antenna 502-N$_A$, where beamforming is done in the analog domain, and the resulting beamformed signals is then compressed in the frequency domain by the NBRs 516.

Receiving signals in only a subset of directions for PRACH preamble detection may be beneficial in implementations in which the interface/hardware limitations require further reduction of the amount of data transferred from the narrowband receivers 516 to the baseband unit 506. This implies that the narrowband receivers 516 listen to only a subset of the spatial domain at a time. For example, the narrowband receivers 516 may listen to a spatial domain covered by four SSB beams at a time. In that case, in the previous example, three PRACH occasions can be scheduled, e.g., in slots 9, 19, and 29 respectively. There is still a 90 slot latency reduction and significant overhead reduction. Note that if the Release 15 3GPP specifications are used, the PRACH occasions can be scheduled in slot 39, 79, or 119. Slot 159 can be scheduled for PUSCH, unlike the case where all 12 SSBs are mapped to 1 RACH occasion. In this case, there is a time-frequency resource overhead reduction.

If use of a long format PRACH is desired (e.g., to increase cell coverage), the same solution can be applied. For example, in an embodiment in which the narrowband receivers 516 receive in all directions, twelve symbols instead of six symbols in slot 29 can be reserved for PRACH, again referring to FIG. 6. Note that, if using Release 15 3GPP specifications, symbols in slot 39, 79, 119, and 159 can be reserved for PRACH.

At the base station 402, the outputs of the narrowband receivers 516 or, if present, the accumulators 518 are sent to the baseband unit 506 over the interface. In the baseband unit 506, the received signals are transformed from the time domain to the frequency domain by, e.g., a Fast Fourier Transform (FFT) in order to extract the portions of the signals that are in the time-frequency resources to be processed for PRACH preamble detection. The resulting extracted frequency domain signals may further be processed to ensure adequate Signal to Interference plus Noise Ratio (SINR) level so that PRACH preambles, if any, can be successfully detected. As an example, beamforming weights corresponding to the beam directions for each of the previously transmitted SSBs can be applied to the extracted frequency domain signals. After that, resulting beamformed signals are processed by a PRACH detector or receiver for PRACH preamble detection.

Figure 7:
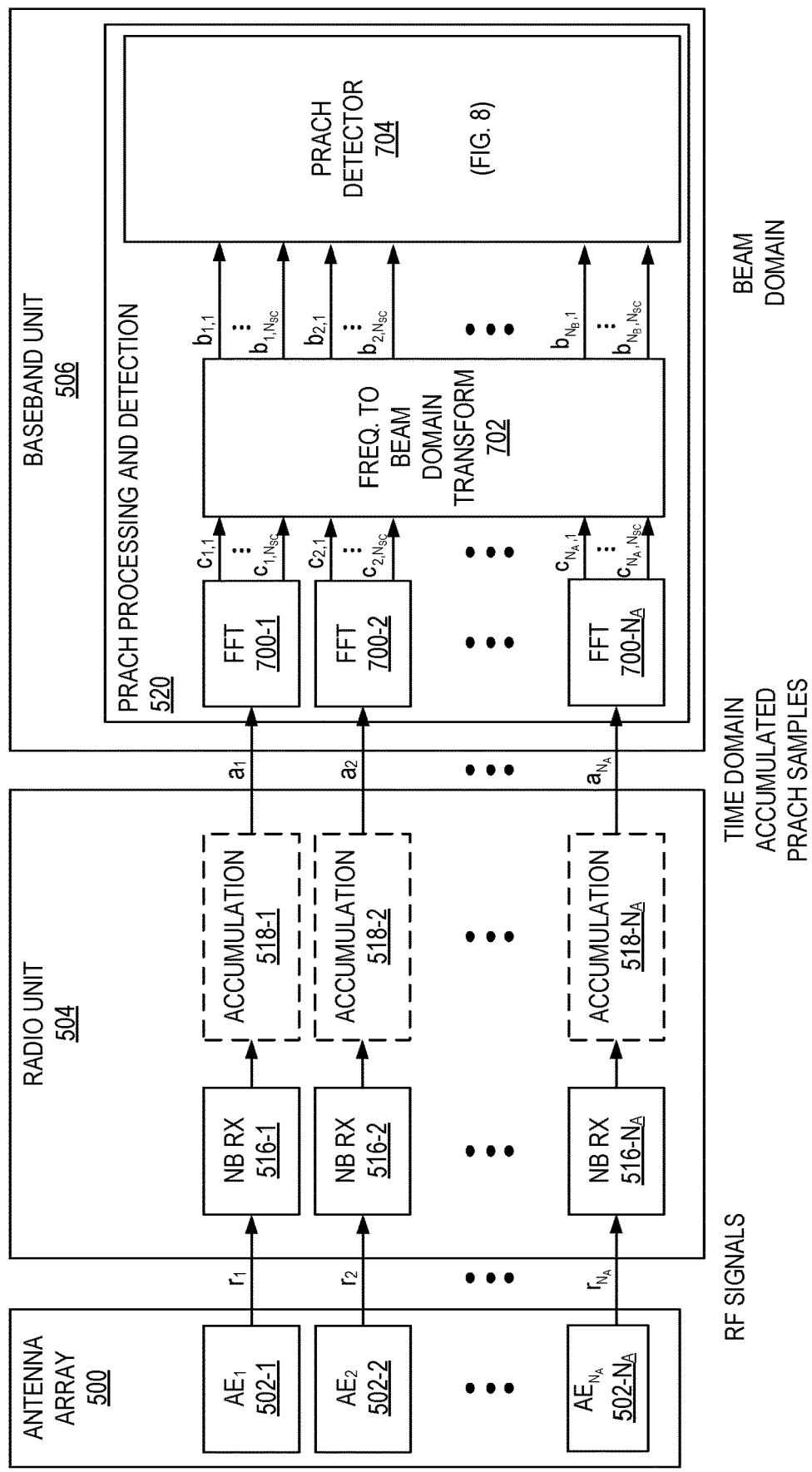
FIGS. 7 and 8 illustrate one example embodiment of the narrowband receivers, the optional accumulators, and the PRACH processing and detection circuitry of FIG. 5.
Figure 8:
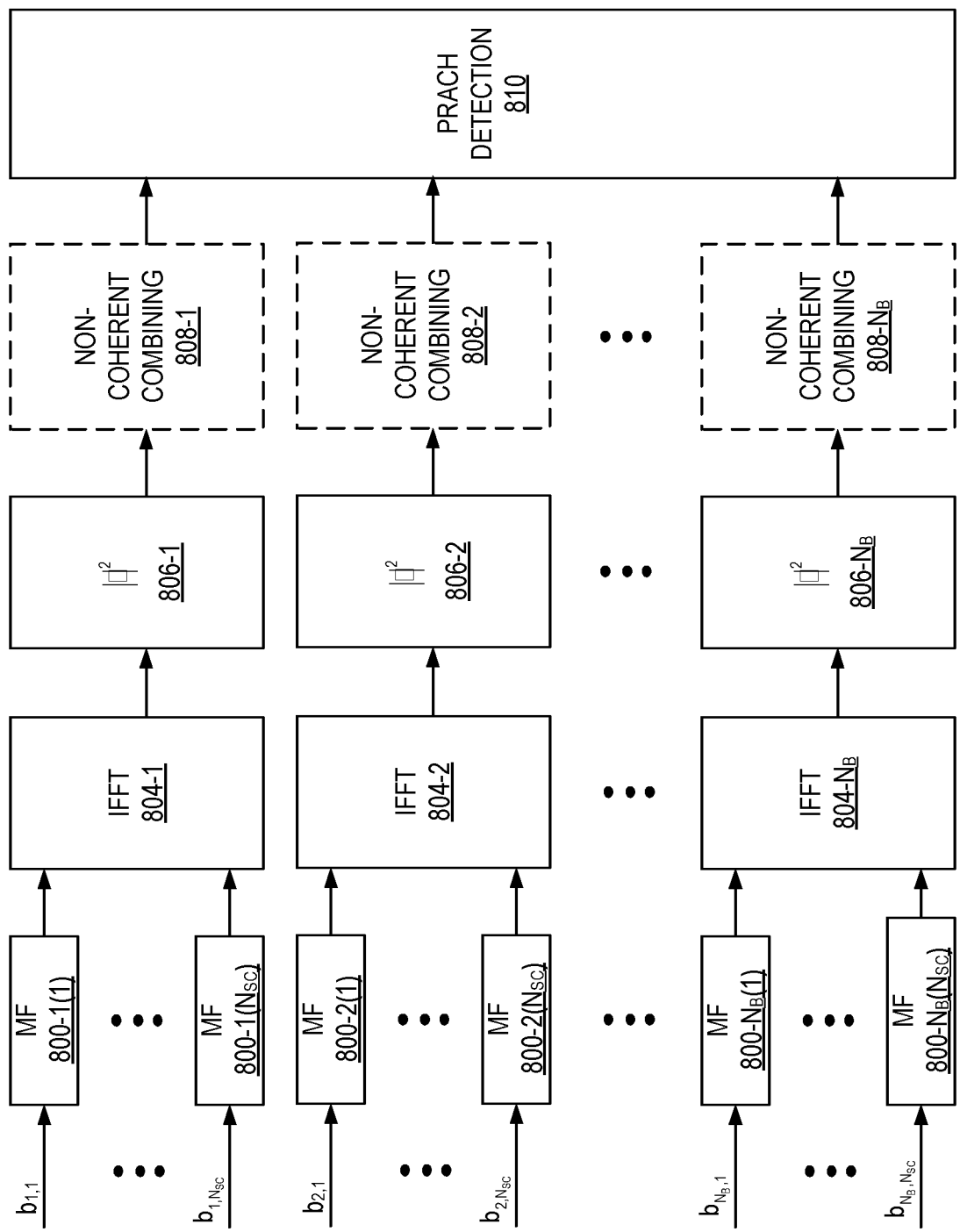

One example embodiment of the narrowband receivers 516, the optional accumulators 518, and the PRACH processing and detection circuitry 520 is illustrated in FIGS. 7 and 8. Optional components are represented by dashed lines. As illustrated, the antenna array 500 includes a number ($N_A$) of antenna elements 502-1 through 502-$N_A$, which are labelled as $AE_1$ through $AE_{N_A}$. Within the radio unit 504, the narrowband receivers 516 include narrowband receivers 516-1 through 516-$N_A$ coupled to the antenna elements 502-1 through 502-$N_A$, respectively, and the accumulation circuitry 518 includes accumulation circuits 518-1 through 518-$N_A$. In operation, the narrowband receivers 516-1 through 516-$N_A$ receive signals $r_1$ through $r_{N_A}$ from the antenna elements 502-1 through 502-$N_A$, respectively, and process the signals $r_1$ through $r_{N_A}$ to output narrowband receive signals in the time domain for, in this example, each of the antenna elements 502-1 through 502-$N_A$. The narrowband receive signals correspond to time domain representations of a number of OFDM symbols, limited to the bandwidth of the narrowband receivers 516-1 through 516-$N_A$ and, in this example, limited to OFDM symbols in which PRACH preambles may be present. Optionally, the accumulation circuit 518-1 accumulates a number (N) of the OFDM symbols received via the antenna element 502-1 to output an averaged symbol for the antenna element 502-1. Likewise, the accumulation circuit 518-2 accumulates a number (N) of the OFDM symbols received via the antenna element 502-2 to output an averaged symbol for the antenna element 502-2, etc. The averaged symbols are denoted in FIG. 7 as $a_1$ through $a_{N_A}$. The radio unit 504 communicates the narrowband receive signals or, optionally, the averaged symbols $a_1$ through $a_{N_A}$ to a baseband unit 506 via a communication interface, as discussed above.

In some embodiments, the number (N) of symbols accumulated by the accumulation circuitry 518-1 through 518-$N_A$ is a fraction of the total number of OFDM symbols used for a PRACH preamble. In this case, the radio unit 504 communicates the averaged symbols $a_1$ through $a_{N_A}$ to the baseband unit 506 resulting from the first accumulation period (i.e., the period of time corresponding to the first N OFDM symbols), then separately communicates averaged symbols $a_1$ through $a_{N_A}$ to the baseband unit 506 resulting from the second accumulation period (i.e., the period of time corresponding to the second N OFDM symbols), etc. Thus, the radio unit 504 outputs a set of averaged symbols $a_1$ through $a_{N_A}$ for each accumulation period. Each of these sets of averaged PRACH symbols is then processed by the PRACH processing and detection circuitry 520 of the baseband unit 506, as described below.

At the PRACH processing and detection circuitry 520 of the baseband unit 506, the narrowband receive signals (i.e., the non-averaged OFDM symbols) from the narrowband receiver 516-1 through 516-$N_A$ or, alternatively, the averaged symbols from the accumulation circuitries 518-1 through 518-$N_A$ are processed by FFTs 700-1 through 700-$N_A$ and frequency-to-beam domain transformation circuitry 702. The FFTs 700-1 through 700-$N_A$ and the frequency-to-beam domain transformation circuitry 702 operate as follows. The following discussion assumes that the accumulation circuitry 518 is present. If the accumulation circuitry 518 is present and there are multiple sets of averaged OFDM symbols, then this process is repeated for each set of averaged OFDM symbols. Note, however, if the accumulation circuitry 518 is not present, the described processing applies to the narrowband received signals (i.e., the non-averaged OFDM symbols) output by the narrowband receivers 516.

The FFT 700-1 operates to transform the averaged symbol $a_1$ from the time domain to the frequency domain to thereby provide a frequency domain representation of the averaged PRACH symbol $a_1$. This frequency domain representation comprises an output for each subcarrier of the PRACH (i.e., each subcarrier of the RACH occasion for which PRACH preamble detection is being performed). These outputs are denoted in FIG. 7 as $c_{1,1}$ to $c_{1,N_{SC}}$, where $c_{x,y}$, x is an index of the corresponding antenna element, y is an index of the corresponding subcarrier, and $N_{SC}$ is the total number of subcarriers in the PRACH. Likewise, the FFT 700-2 operates to transform the averaged PRACH symbol $a_2$ from the time domain to the frequency domain to thereby provide a frequency domain representation of the averaged PRACH symbol $a_2$, etc.

While not illustrated, additional processing may be performed, e.g., after the FFTs 700 to extract only those (averaged) OFDM symbols that correspond to the PRACH occasion for which each detection is being performed.

The frequency-to-beam domain transformation circuitry 702 transforms the outputs of all of the FFTs 700-1 through 700-$N_A$ from the antenna domain to the beam domain to thereby provide beam domain outputs for each subcarrier for each receive beam to be search for a PRACH preamble. In FIG. 7, the beam domain outputs are denoted as $b_{x,y}$, where here x is an index of the corresponding beam and y is an index of the corresponding subcarrier, $N_{SC}$ is the total number of subcarriers in the PRACH, and $N_B$ is the total number of receive beams. Thus, as an example, the beam domain outputs $b_{i,1}$ to $b_{i,N_{SC}}$ are a frequency domain representation of an averaged symbol received on the i-th receive beam. Note that the frequency-to-beam transformation may be performed by applying beamforming weights that correspond to the transmit beams used for transmission of the SSBs that are mapped to the RACH occasion for which PRACH preamble detection is being performed.

For each set of averaged PRACH symbols, the respective beam domain outputs generated by the frequency-to-beam domain transformation circuitry 702 are communicated to a PRACH detector 704. The details of one example embodiment of the PRACH detector 704 is illustrated in FIG. 8. As illustrated in FIG. 8, the PRACH detector 704 includes, for each i-th receive beam (for i=1, ..., $N_B$), matched filters 800-$i$(1) through 800-$i$($N_{SC}$) that perform matched filtering of the beam domain outputs $b_{i,1}$ to $b_{i,N_{SC}}$ for the i-th receive beam based on a frequency domain representation of the PRACH preamble (also referred to here as a PRACH sequence) for which detection is being performed. This matched filtering may be repeated for each of a number of possible PRACH sequences.

For each i-th receive beam (for i=1, ..., NB), the outputs of the matched filters 800-$i$(1) through 800-$i$($N_{SC}$) for the i-th receive beam are transformed from the frequency domain to the time domain by a respective Inverse FFT (IFFT) 804-$i$. The time domain output of the IFFT 804-$i$ is recalculated to power by a corresponding magnitude squared calculation circuit 806-$i$. The magnitude squared value for the i-th receive beam is passed to a non-coherent combining circuit 808-$i$ for the i-th beam. The non-coherent combining circuit 808-$i$ is optional and operates to non-coherently combine the magnitude squared value for the output of the IFFT 804-$i$ resulting from the averaged PRACH symbol with magnitude squared value(s) for the output of the IFFT 804-$i$ resulting from an additional averaged PRACH symbol. This is the case if the number (N) of PRACH symbols accumulated is a fraction of the total number of PRACH symbols for the PRACH preamble.

The outputs of the non-coherent combining circuitries 808-1 through 808-NB are provided to PRACH detection circuitry 810. For each i-th receive beam, the PRACH detection circuitry 810 makes a decision as to whether a PRACH preamble is detected for that receive beam based on the output of the respective non-coherent combining circuit 808-$i$, as will be appreciated by one of ordinary skill in the art.

Note that, as the scheduler of the base station 402 decides which physical channels to be scheduled, the scheduler sends control command(s) to the radio unit 504 such that that the narrowband receivers 516 are configured to select the appropriate frequency carrier and frequency (and optionally time) resources used for the PRACH occasion(s) for which PRACH preamble detection is to be performed. Also note that the scheduler also decides how to utilize the PRBs on the same symbols outside the bandwidth of the narrowband receivers 516. The signal/physical channels scheduled on those PRBs will be received by the wideband receiver 508.

Figure 9:
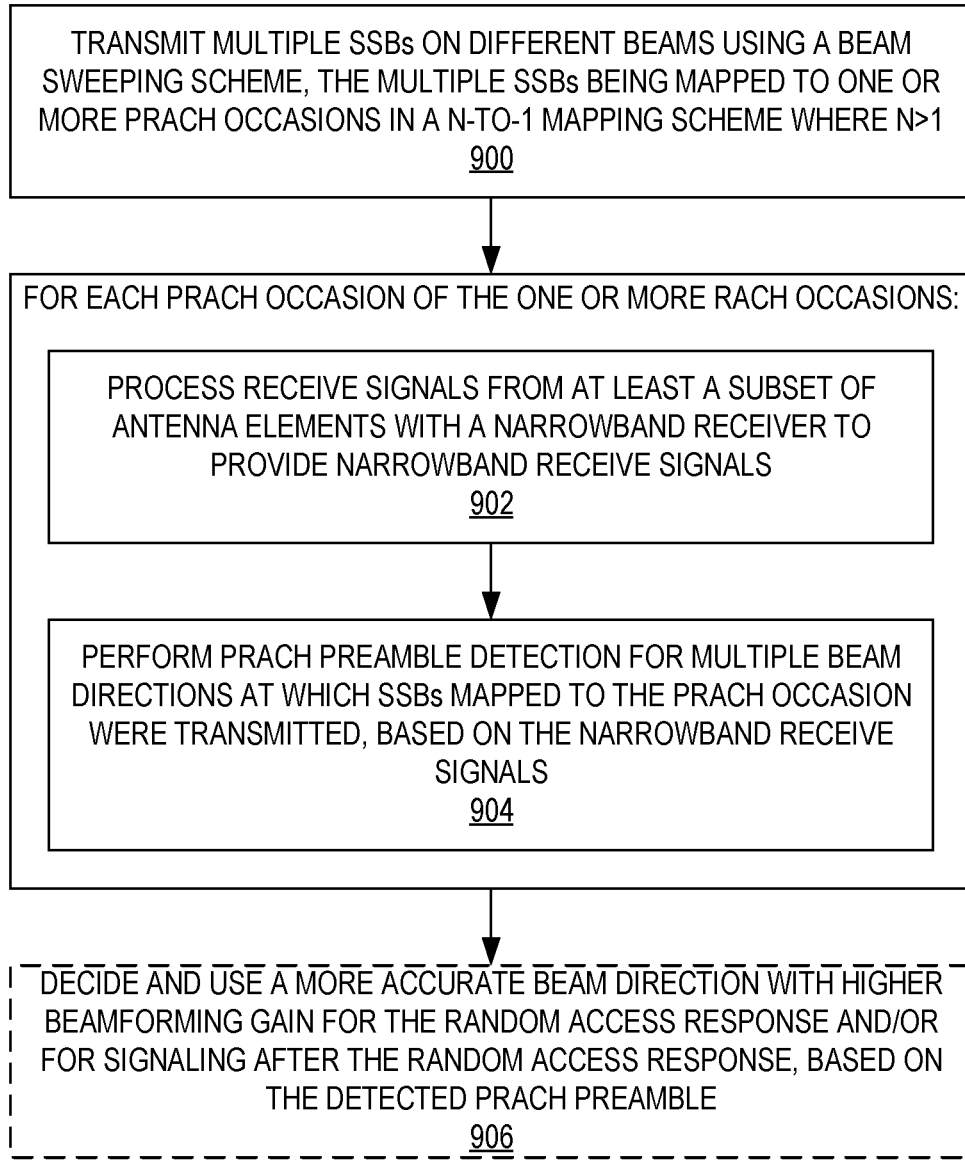
FIG. 9 is a flow chart that illustrates the operation of a base station in accordance with an embodiment of the present disclosure.

FIG. 9 is a flow chart that illustrates the operation of the base station 402 in accordance with embodiments of the present disclosure. As illustrated, the base station 402 transmits multiple SSBs on multiple respective beams in accordance with a beam sweeping scheme (step 900). The multiple SSBs are mapped to one or more RACH occasions in accordance with an N-to-1 mapping scheme where N>1. In one embodiment, all of the SSBs are mapped to a single PRACH occasion, as described above.

In another embodiment, the beam directions of the beams on which the SSBs are transmitted are divided into two or more sets of directions, thereby dividing the SSBs into two or more sets of SSBs. The two or more sets of SSBs are mapped to two or more respective PRACH occasions, as described above. Note that the sets of directions, and thus the sets of SSBs, are mutually exclusive such that each beam direction/SSB is in only one set. Further, each set of directions includes those beam directions that are adjacent to one another (i.e., that are spatially adjacent or near to one another). For example, consider a simplified scenario in which the beam directions form a two-dimensional (2D) circle. Then, as an example, the beam directions from 0 degrees to 180 degrees around the origin of the 2D circle may be in a first set of directions and the beam directions from 180 degrees to 360 degrees around the origin of the 2D circle may be in a second set of directions. In this manner, the narrowband receivers 516 at the base station 402 can be used to perform PRACH preamble reception and detection for each set of directions during the respective PRACH occasions.

For each PRACH occasion of the one or more PRACH occasions mapped to the SSBs, the base station 402 and, more specifically, the narrowband receivers 516 and the PRACH processing and detection circuitry 520 at the base station 402, perform PRACH preamble reception and detection as follows. For each PRACH occasion, the base station 402 processes the receive signals from at least a subset of the antenna elements 502-1 through 502-$N_A$ using the narrowband receivers 516 to provide the narrowband receive signals, as described above (step 902). The narrowband receive signals are also referred to herein as OFDM symbols. Optionally, this processing includes accumulation or averaging of the OFDM symbols, as described above.

Based on the narrowband receive signals (or optionally the accumulated OFDM symbols), the base station 402, and more specifically the PRACH processing and detection circuitry 520, performs PRACH preamble detection for multiple beam directions at which the SSBs mapped to the PRACH occasion were transmitted in step 900, as described above (step 904). Importantly, by using the narrowband receivers 516 to listen for PRACH preambles in multiple directions simultaneously during the single PRACH occasion, the amount of time needed to perform PRACH preamble detection after sweeping the SSB beams is substantially reduced and frequency resource utilization is substantially improved, as described above. Note that FIGS. 7 and 8 illustrate one example of the processing of step 904; however, the present disclosure is not limited thereto. One of skill in the art will appreciate that the procedure used for PRACH processing and detection can vary. As such, any suitable PRACH processing and detection procedure can be used. Once a PRACH preamble(s) is(are) detected, the base station 402 can continue the random access procedure, e.g., in the conventional manner, as will be understood by those of ordinary skill in the art. In one embodiment, the base station 402 can further process the received PRACH signal to decide a more accurate beam direction with higher beamforming gain (step 906). The newly decided beam direction can be directly applied on the random access response and/or the signaling after the random access response. This can significantly improve link budget.

Figure 10:
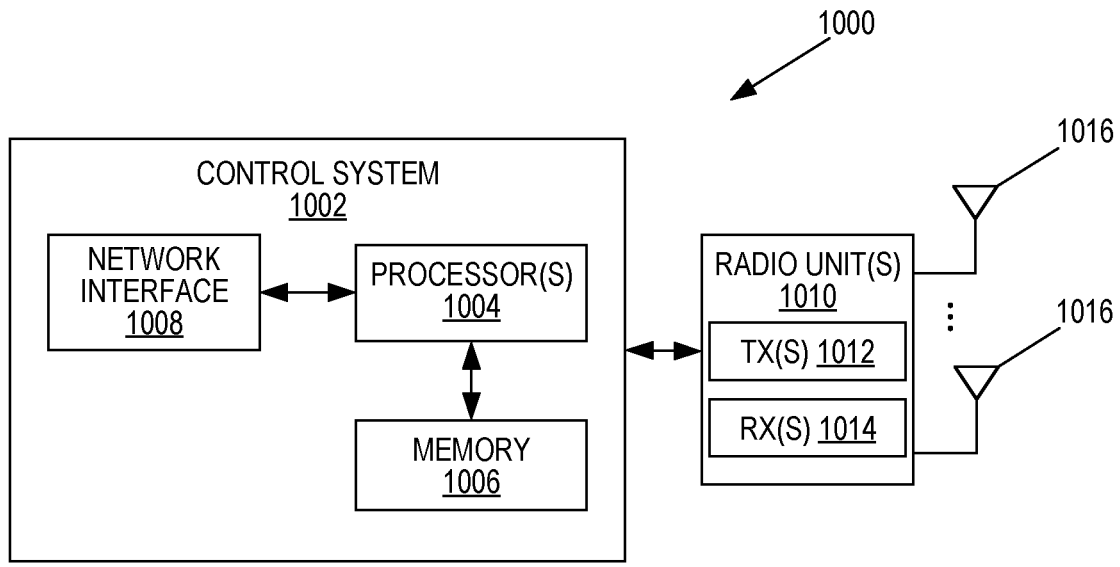
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, the base station 402 or a network node that implements all or part of the functionality of the base station 402 described herein. As illustrated, the radio access node 1000 includes a control system 1002 that includes one or more processors 1004 (e.g., Central Processing Units (CPUs), ASICs, Field Programmable Gate Arrays (FPGAs), and/or the like), memory 1006, and a network interface 1008. The one or more processors 1004 are also referred to herein as processing circuitry. In addition, the radio access node 1000 includes one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein (e.g., one or more functions of the base station 402 described herein). For example, in one embodiment, the one or more processors 1004 implement the functionality of the baseband unit 506 described above. Further, in some embodiments, functionality of the radio unit 504 described above is implemented in the radio unit(s) 1010.

Figure 11:
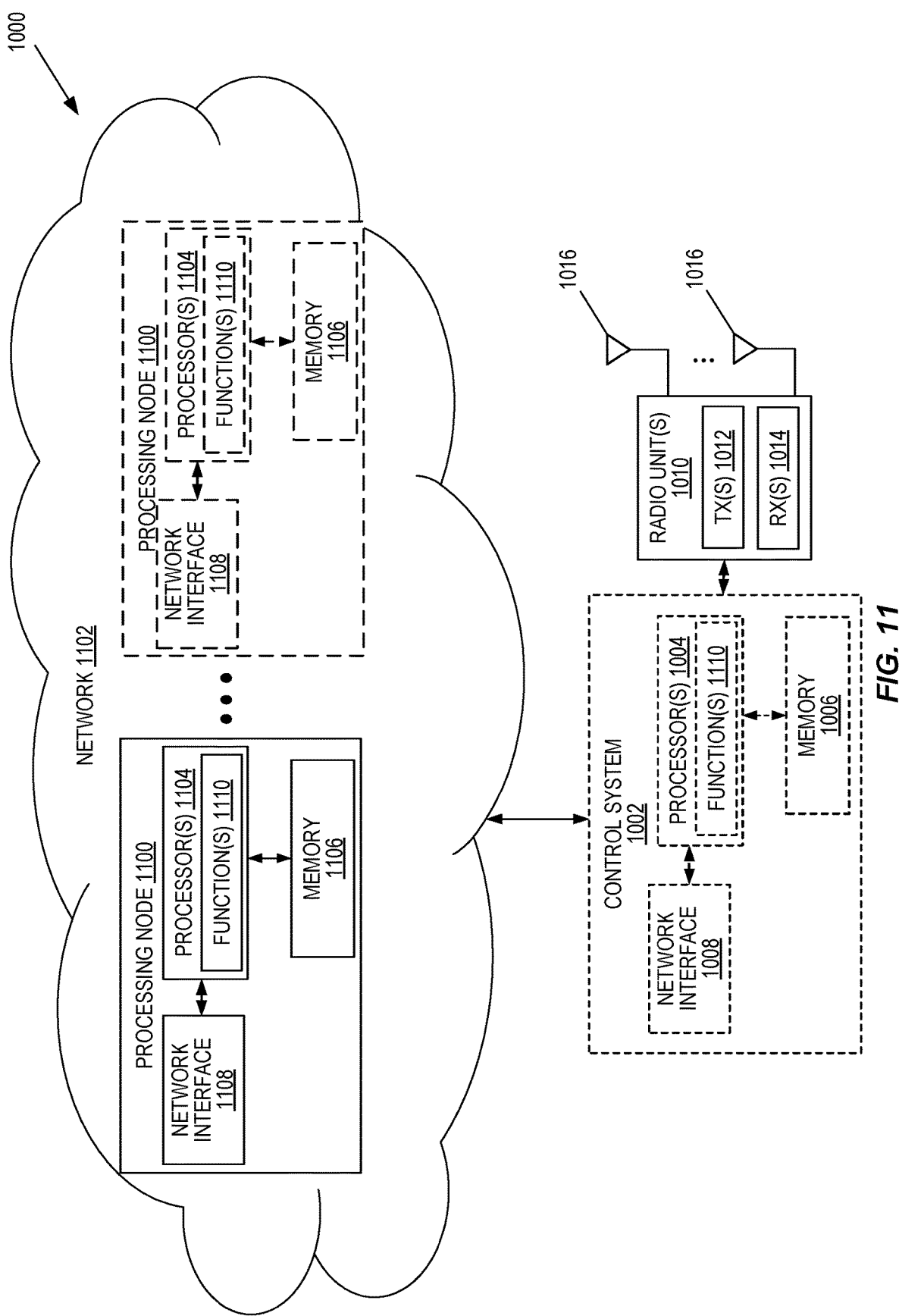
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the radio access node 1000 described herein (e.g., some or all of the functions of the baseband unit 506 of the base station 402) are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
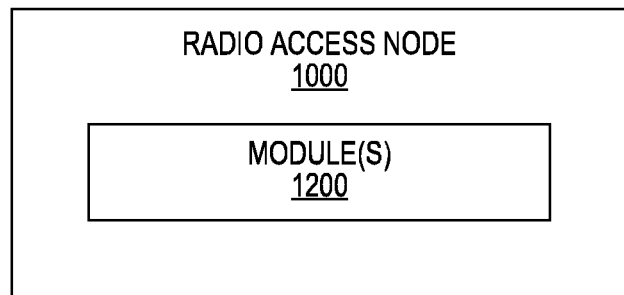
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 (e.g. one or more functions of the base station 402) described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2D Two-Dimensional
3GPP Third Generation Partnership Project
5G Fifth Generation
5GC Fifth Generation Core
5GS Fifth Generation System
AMF Access and Mobility Function
ASIC Application Specific Integrated Circuit
AUSF Authentication Server Function
CPU Central Processing Unit
DSP Digital Signal Processor
eNB Enhanced or Evolved Node B
FFT Fast Fourier Transform
FPGA Field Programmable Gate Array
GHz Gigahertz
gNB New Radio Base Station
gNB-DU New Radio Base Station Distributed Unit
HSS Home Subscriber Server
IFFT Inverse Fast Fourier Transform
IoT Internet of Things
LTE Long Term Evolution
MHz Megahertz
MIMO Multiple Input Multiple Output
MME Mobility Management Entity
mmW Millimeter Wave
MTC Machine Type Communication
NBR Narrowband Receiver
NEF Network Exposure Function
NF Network Function
ng-eNB Next Generation Enhanced or Evolved Node B
NG-RAN Next Generation Radio Access Network
NR New Radio
NRF Network Function Repository Function
NSSF Network Slice Selection Function
OFDM Orthogonal Frequency Division Multiplexing
PBCH Physical Broadcast Channel
PC Personal Computer
PCF Policy Control Function
PCI Physical Cell Identity
P-GW Packet Data Network Gateway
PRACH Physical Random Access Channel
PRB Physical Resource Block
PSS Primary Synchronization Signal
PUSCH Physical Uplink Shared Channel
RACH Random Access Channel
RAM Random Access Memory
RAN Radio Access Network
RAT Radio Access Technology
ROM Read Only Memory
RRH Remote Radio Head
SCEF Service Capability Exposure Function
SINR Signal to Interference plus Noise Ratio
SMF Session Management Function
SSB Synchronization Signal Block
SSS Secondary Synchronization Signal
TDD Time Division Duplexing
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a base station for random access in a cellular communications system, the method comprising:

transmitting a plurality of Synchronization Signal Blocks, SSBs, on a respective plurality of transmit beams in accordance with a beam sweeping scheme, wherein the plurality of SSBs are mapped to one or more Random Access Channel, RACH, occasions in accordance with an N-to-1 mapping scheme where N is greater than 1; and for each RACH occasion of the one or more RACH occasions:

processing a plurality of receive signals from at least a subset of a plurality of antenna elements in an antenna array of the base station using a respective plurality of narrowband receivers to thereby provide a plurality of narrowband receive signals; and performing, based on the plurality of narrowband receive signals, random access preamble detection for a plurality of beam directions that correspond to at least a subset of the plurality of transmit beams on which at least a subset of the plurality of SSBs to which the RACH occasion is mapped were transmitted.

2. The method of claim 1 wherein the one or more RACH occasions consist of a single RACH occasion, and all of the plurality of SSBs are mapped to the single RACH occasion.

3. The method of claim 1 wherein the one or more RACH occasions comprise a first RACH occasion and a second RACH occasion, and the plurality of SSBs comprise a first set of SSBs mapped to the first RACH occasion and a second set of SSBs mapped to the second RACH occasion.

4. The method of claim 3 wherein the first set of SSBs and the second set of SSBs are mutually exclusive.

5. The method of claim 3 wherein the first set of SSBs is a first subset of the plurality of SSBs that are transmitted on a first subset of the plurality of transmit beams having beam directions that are spatially adjacent to one another, and the second set of SSBs is a second subset of the plurality of SSBs that are transmitted on a second subset of the plurality of transmit beams having beam directions that are spatially adjacent to one another.

6. The method of claim 1, wherein a bandwidth of each of the plurality of narrowband receivers is equal to or greater than a bandwidth of each of the one or more RACH occasions.

7. The method of claim 1, wherein a bandwidth of each of the plurality of narrowband receivers is less than a bandwidth of wideband receiver of the base station.

8. The method of claim 1, wherein the plurality of narrowband receive signals correspond to Orthogonal Frequency Division Multiplexing, OFDM, symbols, or accumulated OFDM symbols.

9. The method of claim 1, wherein performing random access preamble detection comprises detecting a random access preamble on one of the plurality of beam directions, and the method further comprises:

determining a beam direction based on the detected random access preamble; and using the determined beam direction for transmission of a random access response and/or for signaling after the random access response.

10. A base station for random access in a cellular communications system, the base station adapted to:

transmit a plurality of Synchronization Signal Blocks, SSBs, on a respective plurality of transmit beams in accordance with a beam sweeping scheme, wherein the plurality of SSBs are mapped to one or more Random Access Channel, RACH, occasions in accordance with an N-to-1 mapping scheme where N is greater than 1; and for each RACH occasion of the one or more RACH occasions:
  process a plurality of receive signals from at least a subset of a plurality of antenna elements in an antenna array of the base station using a respective plurality of narrowband receivers to thereby provide a plurality of narrowband receive signals; and
  perform, based on the plurality of narrowband receive signals, random access preamble detection for a plurality of beam directions that correspond to at least a subset of the plurality of transmit beams on which at least a subset of the plurality of SSBs to which the RACH occasion is mapped were transmitted.

11. The base station of claim 10 wherein the one or more RACH occasions consist of a single RACH occasion, and all of the plurality of SSBs are mapped to the single RACH occasion.

12. The base station of claim 10 wherein the one or more RACH occasions comprise a first RACH occasion and a second RACH occasion, and the plurality of SSBs comprise a first set of SSBs mapped to the first RACH occasion and a second set of SSBs mapped to the second RACH occasion.

13. The base station of claim 12 wherein the first set of SSBs and the second set of SSBs are mutually exclusive.

14. The base station of claim 12 wherein the first set of SSBs is a first subset of the plurality of SSBs that are transmitted on a first subset of the plurality of transmit beams having beam directions that are spatially adjacent to one another, and the second set of SSBs is a second subset of the plurality of SSBs that are transmitted on a second subset of the plurality of transmit beams having beam directions that are spatially adjacent to one another.

15. The base station of claim 10, wherein a bandwidth of each of the plurality of narrowband receivers is equal to or greater than a bandwidth of each of the one or more RACH occasions.

16. The base station of claim 10, wherein a bandwidth of each of the plurality of narrowband receivers is less than a bandwidth of a wideband receiver of the base station.

17. The base station of claim 10, wherein the plurality of narrowband receive signals correspond to Orthogonal Frequency Division Multiplexing, OFDM, symbols, or accumulated OFDM symbols.

18. The base station of claim 10, wherein performing random access preamble detection comprises detecting a random access preamble on one of the plurality of beam directions, and the base station is further adapted to:
  determine a beam direction based on the detected random access preamble; and
  use the determined beam direction for transmission of a random access response and/or for signaling after the random access response.

19. A base station for random access in a cellular communications system, the base station comprising:
  an antenna array comprising a plurality of antenna elements;
  a radio unit comprising:
    a wideband transmitter coupled to the plurality of antenna elements; and
    a plurality of narrowband receivers coupled to at least a subset of the plurality of antenna elements, respectively; and
  a baseband unit configured to:
    transmit, via the wideband transmitter of the radio unit, a plurality of Synchronization Signal Blocks, SSBs, on a respective plurality of transmit beams in accordance with a beam sweeping scheme, wherein the plurality of SSBs are mapped to one or more Random Access Channel, RACH, occasions in accordance with an N-to-1 mapping scheme where N is greater than 1; and
    for each RACH occasion of the one or more RACH occasions:
      receive, via the plurality of narrowband receivers, a plurality of narrowband receive signals; and
      perform, based on the plurality of narrowband receive signals, random access preamble detection for a plurality of beam directions that correspond to at least a subset of the plurality of transmit beams on which at least a subset of the plurality of SSBs to which the RACH occasion is mapped were transmitted.

* * * * *